(12) United States Patent
Yao

(10) Patent No.: US 11,996,542 B2
(45) Date of Patent: May 28, 2024

(54) METHOD OF MANUFACTURING SOLVENTLESS MULTILAYERED ELECTRODES

(71) Applicant: EnPower, Inc., Indianapolis, IN (US)

(72) Inventor: Adrian Yao, Phoenix, AZ (US)

(73) Assignee: EnPower, Inc., Indianapolis, IN (US)

( * ) Notice: Subject to any disclaimer, the term of this patent is extended or adjusted under 35 U.S.C. 154(b) by 0 days.

(21) Appl. No.: 17/825,938

(22) Filed: May 26, 2022

(65) Prior Publication Data
US 2022/0293907 A1  Sep. 15, 2022

Related U.S. Application Data

(63) Continuation of application No. 17/459,378, filed on Aug. 27, 2021, now Pat. No. 11,482,697.

(60) Provisional application No. 63/116,645, filed on Nov. 20, 2020.

(51) Int. Cl.
| | |
|---|---|
| *H01M 4/04* | (2006.01) |
| *H01M 4/36* | (2006.01) |
| *H01M 4/62* | (2006.01) |
| *H01M 10/05* | (2010.01) |
| *H01M 10/0525* | (2010.01) |

(52) U.S. Cl.
CPC ....... *H01M 4/0435* (2013.01); *H01M 4/0404* (2013.01); *H01M 4/366* (2013.01); *H01M 4/623* (2013.01); *H01M 10/0525* (2013.01)

(58) Field of Classification Search
None
See application file for complete search history.

(56) References Cited

U.S. PATENT DOCUMENTS

| 2016/0149208 A1* | 5/2016 | Suzuki | H01M 4/0404 |
| | | | 429/209 |
| 2017/0288258 A1* | 10/2017 | Rho | H01M 10/058 |
| 2020/0136101 A1* | 4/2020 | Ardebili | H01M 4/747 |
| 2020/0313175 A1* | 10/2020 | Shin | H01G 11/26 |
| 2021/0249647 A1* | 8/2021 | Wurm | H01M 4/0404 |

FOREIGN PATENT DOCUMENTS

WO   WO 2019/219719   * 11/2019   ............ H01M 4/624

* cited by examiner

*Primary Examiner* — Maria Laios
*Assistant Examiner* — Angela J Martin
(74) *Attorney, Agent, or Firm* — Kolitch Romano Dascenzo Gates LLC

(57) ABSTRACT

A method for manufacturing a solventless multilayered electrode may include mixing electrode particles with binders to form dry electrode mixtures, compressing the dry electrode mixtures to form electrode films, stacking the electrode films, and compressing the stacked electrode films. Suitable electrode films may include active material particles, conductive particles, electrochemically inactive ceramic particles, and/or the like. In some examples, compressing the stacked electrode films may include compressing the electrode films between pairs of rollers having patterns disposed on one or more exterior surfaces, thereby increasing surface roughness of the electrode films. A system for manufacturing solventless multilayered electrodes may comprise a first plurality of rollers configured to compress dry electrode mixes into electrode films, and a second plurality of rollers configured to compress a stack of electrode films into a single electrode stack.

11 Claims, 10 Drawing Sheets

METHOD OF MANUFACTURING SOLVENTLESS MULTILAYERED ELECTRODES

CROSS-REFERENCES

The following applications and materials are incorporated herein, in their entireties, for all purposes: U.S. Provisional Patent Application Ser. No. 63/116,645, filed Nov. 20, 2020; U.S. patent application Ser. No. 17/459,378, filed Aug. 27, 2021.

FIELD

This disclosure relates to systems and methods for electrodes and electrochemical cells. More specifically, the disclosed embodiments relate to methods of manufacturing solventless multilayered electrodes.

INTRODUCTION

Environmentally friendly sources of energy have become increasingly critical, as fossil fuel-dependency becomes less desirable. Most non-fossil fuel energy sources, such as solar power, wind, and the like, require some sort of energy storage component to maximize usefulness. Accordingly, battery technology has become an important aspect of the future of energy production and distribution. Most pertinent to the present disclosure, the demand for secondary (i.e., rechargeable) batteries has increased. Various combinations of electrode materials and electrolytes are used in these types of batteries, such as lead acid, nickel cadmium (Ni-Cad), nickel metal hydride (NiMH), nickel manganese cobalt oxide (NMC), nickel cobalt aluminum oxide (NCA), lithium ion (Li-ion), and lithium-ion polymer (Li-ion polymer). Solvents commonly used in manufacturing processes for electrodes and electrochemical cells are expensive and may be harmful to the environment.

SUMMARY

The present disclosure provides systems, apparatuses, and methods relating to solventless multilayered electrodes.

In some embodiments, a solventless method for manufacturing an electrode includes: compressing a first dry electrode mixture between a first pair of rollers to form a first standalone electrode film, wherein a first roller of the first pair of rollers includes a pattern disposed on an external surface; increasing a surface roughness of a first surface of the first standalone electrode film using the first patterned roller of the first pair of rollers; compressing a second dry electrode mixture between a second pair of rollers to form a second standalone electrode film, wherein a second roller of the second pair of rollers includes a pattern disposed on an external surface; increasing a surface roughness of a second surface of the second standalone electrode film using the second patterned roller of the second pair of rollers; stacking the first standalone electrode film onto a current collector; stacking the second standalone electrode film onto the first standalone electrode film, such that the first surface of the first standalone electrode film is adjacent to the second surface of the second standalone electrode film; and compressing the stacked electrode films such that interpenetrating boundary structures form between the first standalone electrode film and the second standalone electrode film.

In some embodiments, an electrode for an electrochemical cell comprises: a current collector substrate; a first active material layer layered onto the current collector substrate, the first active material layer comprising a first stand-alone electrode film including a plurality of first active material particles adhered together by a first binder mixture; and a second active material layer layered onto the first active material layer, the second active material layer comprising a second stand-alone electrode film including a plurality of second active material particles adhered together by a second binder mixture; wherein the first active material particles are encapsulated in a polymer matrix formed by the first binder mixture and the second active material particles are encapsulated in a polymer matrix formed by the second binder mixture.

In some embodiments, a system for solventless manufacturing of electrodes includes: a plurality of first pairs of rollers configured to compress dry electrode mixtures comprising particulate into stand-alone electrode films; a hopper configured to pour the dry electrode mixtures into a space between each of the first pairs of rollers; and a second pair of rollers configured to compress a stack of stand-alone electrode films into a single electrode stack.

Features, functions, and advantages may be achieved independently in various embodiments of the present disclosure, or may be combined in yet other embodiments, further details of which can be seen with reference to the following description and drawings.

DETAILED DESCRIPTION

Figure 1:
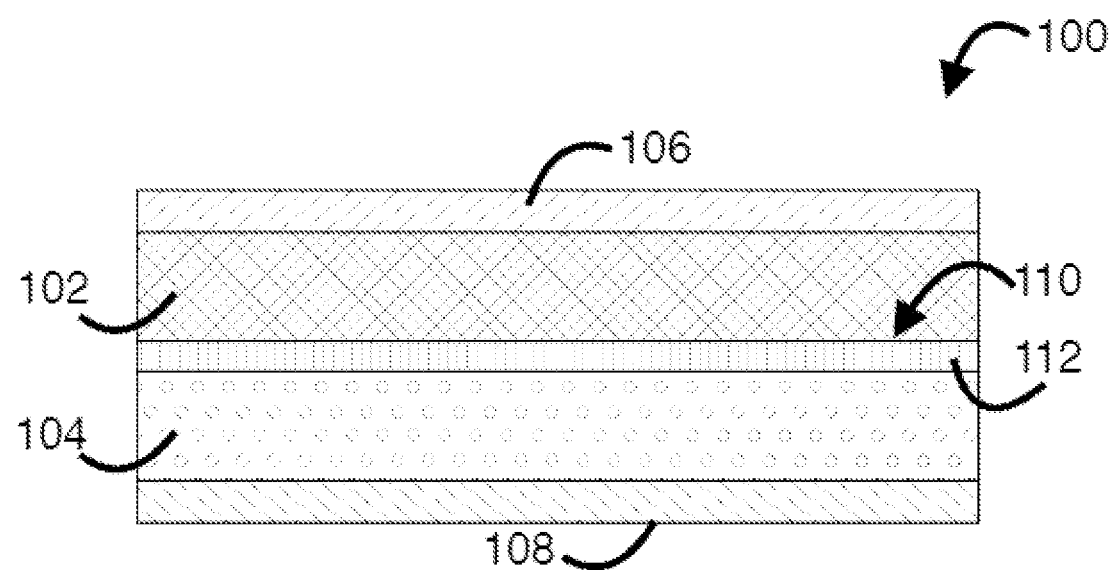
FIG. 1 is an illustrative electrochemical cell in accordance with aspects of the present disclosure.

Various aspects and examples of solventless multilayered electrodes, as well as related methods, are described below and illustrated in the associated drawings. Unless otherwise specified, a solventless multilayered electrode in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections, each of which is labeled accordingly.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

"Providing," in the context of a method, may include receiving, obtaining, purchasing, manufacturing, generating, processing, preprocessing, and/or the like, such that the object or material provided is in a state and configuration for other steps to be carried out.

"PTFE" is polytetrafluorethylene.
"PVDF" is polyvinylidene fluoride.
"PE" is polyethylene.
"PP" is polypropylene.
"PEO" is polyethylene oxide.
"SBR" is steryl butadiene rubber.
"NMP" is n-methyl-2-pyrrolidone.

In this disclosure, one or more publications, patents, and/or patent applications may be incorporated by reference. However, such material is only incorporated to the extent that no conflict exists between the incorporated material and the statements and drawings set forth herein. In the event of any such conflict, including any conflict in terminology, the present disclosure is controlling.

Overview

Solventless multilayered electrodes and electrochemical cells generally include electrode layers formed from a dry powder or other dry mixture of electrode materials, which are then compressed to form electrode layers. In contrast, conventional electrochemical cells are generally manufactured by layering one or more slurries onto a current collector comprising a metal foil and/or other suitable substrate. Slurries utilized in conventional electrochemical cells generally comprise a mixture of suitable electrode materials, such as active material particles, binders, conductive additives, and/or the like, adhered together and/or solvated by a solvent. Manufacturing processes utilizing electrode slurries typically require that electrodes be dried at one or more periods during manufacture, significantly increasing manufacturing time. Additionally, solvents utilized in conventional electrode manufacturing processes may be costly and/or harmful to the environment if not recovered, and manufacturing facilities therefore include solvent recovery systems, increasing cost of production and potential hazards to workers and to the environment.

In contrast, solventless electrodes and electrochemical cells are manufactured from dry mixtures of electrode materials. These dry mixtures include active materials, binders, and any suitable additives such as conductive additives. In some examples, individual mixtures of dry electrode materials are compressed (e.g., calendered, rolled, etc.) to form stand-alone electrode films. The stand-alone electrode films are layered and/or stacked and compressed further to produce a multilayered dry electrode structure. In some examples, electrode films disposed closest to the current collector are laminated (e.g., adhered, heated, and/or cured) onto the current collector after being compressed. In some examples, electrode materials disposed closest to the current collector are compressed onto the current collector, thereby forming a film around or on one side of the current collector.

In some examples, dry electrode mixtures include any and/or all of: active material particles, conductive additives, ceramic particles and/or the like, which are collectively mixed with binders. In some examples, multilayered solventless electrodes include stacked layers of electrode films, each comprising a different dry electrode mixture. Exemplary dry electrode mixtures may comprise any suitable combination of electrode components, such as: active material particles, conductive additives, and binders; ceramic particles and binders; conductive additives and binders; and/or the like.

Solventless multilayered electrodes may be anodes or cathodes. In examples where the solventless multilayered electrodes are anodes, active material particles included in the dry electrode mixtures may comprise any suitable anode material or combination of anode materials, such as graphite (artificial or natural), hard carbon, titanate, titania, transition metals in general, elements in group 14 (e.g., carbon, silicon, tin, germanium, etc.), oxides, sulfides, transition metals, halides, chalcogenides, and/or the like. In examples where the solventless multilayered electrodes are cathodes, active material particles included in the dry electrode mixtures may comprise any suitable cathode material or combination of cathode materials, such as transition metals (for example, nickel, cobalt, manganese, copper, zinc, vanadium, chromium, iron), and their oxides, phosphates, phosphites, silicates, alkalines and alkaline earth metals, aluminum, aluminum oxides and aluminum phosphates, halides, chalcogenides, and/or the like. In some examples, solventless multilayered electrodes include multiple active material layers including active material particles. In these examples, each active material layer may include a different active material or mixture of active material particles.

Binders included in dry electrode mixtures according to aspects of the present disclosure may comprise any suitable material for use in dry electrode processing, such as polytetrafluorethylene (PTFE); polyolefins such as polyvinylidene difluoride (PVDF), polyethylene (PE), polypropylene (PP) polyethylene oxide (PEO), and/or their mixtures or copolymers; steryl butadiene rubber (SBR); polyacrylic acid; polyvinyl alcohol; carboxymethyl cellulose; and/or the like. In some examples, the dry electrode mixtures include binder mixtures comprising a plurality of binders. Exemplary binder mixtures include PTFE mixed with PVDF; PTFE mixed with co-polymers of PVDF, PTFE mixed with PEO; PTFE mixed with PP; and/or the like.

Dry electrode mixtures described above may additionally include conductive additives, which may include any suitable particles configured to increase electrical conductivity within the electrode, such as nanometer-sized carbon (e.g., carbon black and/or graphite); ketjen black; a graphitic carbon; a low dimensional carbon (e.g., carbon nanotubes); a carbon fiber; and/or the like.

In some examples, solventless multilayered electrodes include one or more non-active layers configured to improve electrical properties and electrode stability. These non-active layers do not include active material particles, but may include conductive carbon particles and/or electrochemically inactive and electrically non-conductive inorganic particles mixed with binder mixtures.

A first illustrative non-active layer includes conductive carbon particles, such as nanometer-sized carbon (e.g., carbon black and/or graphite); ketjen black; a graphitic carbon; a low dimensional carbon (e.g., carbon nanotubes); a carbon fiber; and/or the like, mixed with any suitable binder material and/or any mixture thereof, such as polytetrafluoroethylene (PTFE); polyolefins such as polyvinylidene fluoride (PVDF), polyethylene (PE), polypropylene (PP) and/or their mixtures or copolymers; polyethylene oxide (PEO); steryl butadiene rubber (SBR); polyacrylic acid; polyvinyl alcohol; carboxymethyl cellulose; and/or the like. This first exemplary non-active layer (AKA carbon conductive layer) may be disposed between a bottom surface of an electrode active material layer and a top surface of a current collector, and may be configured to increase electrical conductivity between the active material layers and the current collector.

A second illustrative non-active layer includes electrochemically inactive (AKA non-active) ceramic particles comprising any suitable ceramic materials such as aluminum oxide (i.e., alumina ($\alpha$-$Al_2O_3$)), corundum, calcined, tabular, synthetic boehmite, silicon oxides or silica, zirconia, and/or the like, mixed with any suitable binder material and/or any mixture thereof, such as polytetrafluoroethylene (PTFE); polyolefins such as polyvinylidene fluoride (PVDF), polyethylene (PE), polypropylene (PP) and/or their mixtures or copolymers; polyethylene oxide (PEO); steryl butadiene rubber (SBR); polyacrylic acid; polyvinyl alcohol; carboxymethyl cellulose; and/or the like. In some examples, the ceramic particles are electrically non-conductive. This second exemplary non-active layer (AKA separator layer) may be disposed adjacent a top surface of an electrode active material layer, and may be configured such that the separator isolates the electrode (e.g., anode or cathode) from an adjacent electrode included within the electrochemical cell, while maintaining permeability to a charge carrier such as a lithium-ion containing electrolyte.

An illustrative method for manufacturing multilayered solventless electrodes includes mixing electrode materials to form dry electrode mixes; compressing individual electrode mixes to form electrode films; heating the electrode films; stacking the electrode films; compressing the stacked films; and heating the compressed electrode stack.

A manufacturing system for manufacturing multilayered solventless electrodes includes a first plurality of heated rollers configured to compress a first plurality of dry electrode mixes to form a first plurality of electrode films and a second set of heated rollers configured to compress a stack of electrode films to form a multilayered solventless electrode stack. In some examples, certain rollers of the first plurality of heated rollers include patterns disposed on external surfaces, the patterns configured to increase a surface roughness of electrode films formed using the rollers. In some examples, the manufacturing system includes a heater configured to heat a current collector configured to be utilized in the multilayered solventless electrode. In some examples, the heater is configured to laminate a bottom (AKA first) electrode layer onto the current collector, thereby increasing adhesion.

Examples, Components, and Alternatives

The following sections describe selected aspects of illustrative solventless multilayered electrodes as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Electrochemical Cell

This section describes an illustrative electrochemical cell including electrodes according to the present teachings. The electrochemical cell may include any bipolar electrochemical device, such as a battery (e.g., lithium-ion battery, secondary battery).

Referring now to FIG. 1, an electrochemical cell 100 is illustrated schematically in the form of a lithium-ion battery. Electrochemical cell 100 includes a positive and a negative electrode, namely a cathode 102 and an anode 104. The cathode and anode are sandwiched between a pair of current collectors 106, 108, which may comprise metal foils and/or other suitable substrates. Current collector 106 is electrically coupled to cathode 102, and current collector 108 is electrically coupled to anode 104. The current collectors enable the flow of electrons, and thereby electrical current, into and out of each electrode. An electrolyte 110 disposed throughout the electrodes enables the transport of ions between cathode 102 and anode 104. In the present example, electrolyte 110 includes a liquid solvent and a solute of dissolved ions. Electrolyte 110 facilitates an ionic connection between cathode 102 and anode 104.

Electrolyte 110 is assisted by a separator 112, which physically partitions the space between cathode 102 and anode 104. Separator 112 is liquid-permeable, and enables the movement (flow) of ions within electrolyte 110 and between the two electrodes. In some embodiments, electrolyte 110 includes a polymer gel and/or solid ion conductor, augmenting and/or replacing (and performing the function of) separator 112.

Cathode 102 and anode 104 are composite structures, which comprise active material particles, binders, conductive additives, and pores (void space) into which electrolyte 110 may penetrate. An arrangement of the constituent parts of an electrode is referred to as a microstructure, and/or more specifically, an electrode microstructure.

The binder may comprise any suitable material configured to adhere active material particles, binders, and other electrode components into a stand-alone electrode film. In some examples, the binder includes a polyolefin or other non-fibrilizable polymer, such as polyvinylidene difluoride (PVDF), polyethylene (PE), polypropylene (PP), and/or their mixtures or copolymers. In some examples, the binder includes a fibrilizable polymer, such as polytetrafluoroethylene (PTFE) and/or the like. In some examples, the binder includes polyethylene oxide (PEO); steryl butadiene rubber (SBR); polyacrylic acid; polyvinyl alcohol; carboxymethyl cellulose; and/or the like. In some examples, the binder includes a mixture of one or more non-fibrilizable polymers and one or more fibrilizable polymers, such as PTFE mixed with PVDF; PTFE mixed with co-polymers of PVDF, PTFE mixed with PEO; and PTFE mixed with PP.

The conductive additives may include any suitable material configured to conduct within the electrode, such as nanometer-sized carbon (e.g., carbon black and/or graphite); ketjen black; a graphitic carbon; a low dimensional carbon (e.g., carbon nanotubes); a carbon fiber; and/or the like.

In some examples, the chemistry of the active material particles differs between cathode 102 and anode 104. For example, anode 104 may include graphite (artificial or natural), hard carbon, titanate, titania, transition metals in general, elements in group 14 (e.g., carbon, silicon, tin, germanium, etc.), oxides, sulfides, transition metals, halides, and/or chalcogenides. On the other hand, cathode 102 may include transition metals (for example, nickel, cobalt, manganese, copper, zinc, vanadium, chromium, iron), and their oxides, phosphates, phosphites, and/or silicates. The cathode may include alkalines and alkaline earth metals, aluminum, aluminum oxides and aluminum phosphates, as well as halides and/or chalcogenides. In an electrochemical device, active materials participate in an electrochemical reaction or process with a working ion to store or release energy. For example, in a lithium-ion battery, the working ions are lithium ions.

Electrochemical cell 100 may include packaging (not shown). For example, packaging (e.g., a prismatic can, stainless steel tube, polymer pouch, etc.) may be utilized to constrain and position cathode 102, anode 104, current collectors 106 and 108, electrolyte 110, and separator 112.

For electrochemical cell 100 to properly function as a secondary battery, active material particles in both cathode 102 and anode 104 must be capable of storing and releasing lithium ions through the respective processes known as lithiating and delithiating. Some active materials (e.g., layered oxide materials or graphitic carbon) fulfill this function by intercalating lithium ions between crystal layers. Other active materials may have alternative lithiating and delithiating mechanisms (e.g., alloying, conversion).

When electrochemical cell 100 is being charged, anode 104 accepts lithium ions while cathode 102 donates lithium ions. When a cell is being discharged, anode 104 donates lithium ions while cathode 102 accepts lithium ions. Each composite electrode (i.e., cathode 102 and anode 104) has a rate at which it donates or accepts lithium ions that depends upon properties extrinsic to the electrode (e.g., the current passed through each electrode, the conductivity of the electrolyte 110) as well as properties intrinsic to the electrode (e.g., the solid state diffusion constant of the active material particles in the electrode; the electrode microstructure or tortuosity; the charge transfer rate at which lithium ions move from being solvated in the electrolyte to being intercalated in the active material particles of the electrode; etc).

During either mode of operation (charging or discharging) anode 104 or cathode 102 may donate or accept lithium ions at a limiting rate, where rate is defined as lithium ions per unit time, per unit current. For example, during charging, anode 104 may accept lithium at a first rate, and cathode 102 may donate lithium at a second rate. When the second rate is lesser than the first rate, the second rate of the cathode would be a limiting rate. In some examples, the differences in rates may be so dramatic as to limit the overall performance of the lithium-ion battery (e.g., cell 100). Reasons for the differences in rates may depend on an energy required to lithiate or delithiate a quantity of lithium-ions per mass of active material particles; a solid-state diffusion coefficient of lithium ions in an active material particle; and/or a particle size distribution of active material within a composite electrode. In some examples, additional or alternative factors may contribute to the electrode microstructure and affect these rates.

B. Illustrative Method for Manufacturing Multilayered Solventless Electrodes

Figure 2:
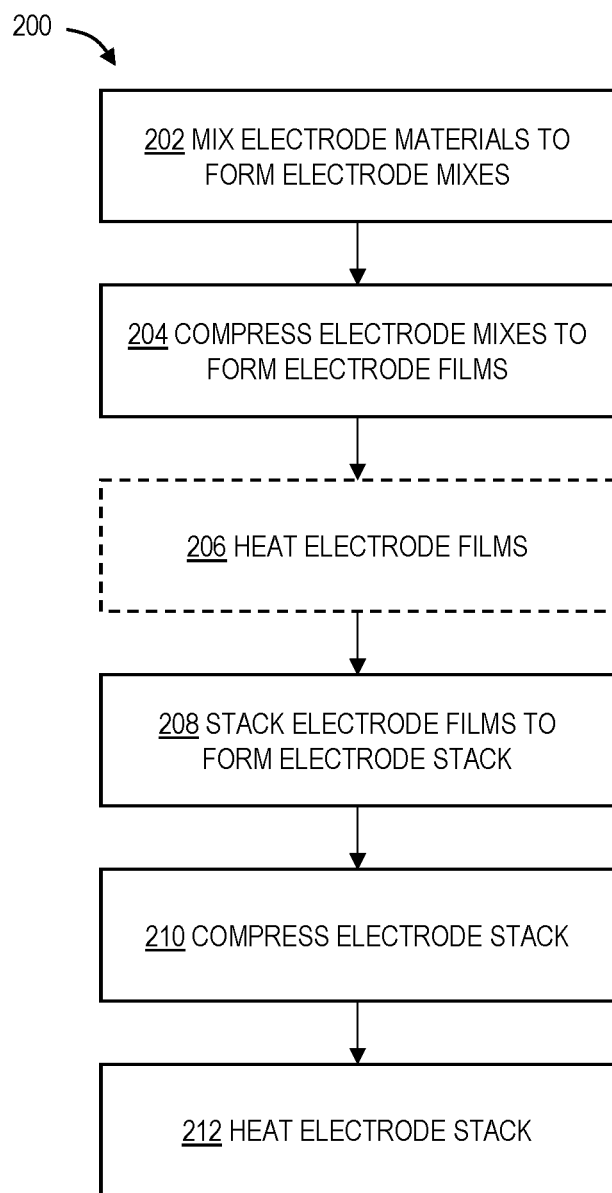
FIG. 2 is a flow chart depicting steps of an illustrative method for manufacturing solventless multilayered electrodes.

This section describes steps of an illustrative method 200 for manufacturing multilayered solventless electrodes; see FIG. 2. Aspects of electrochemical cells described above may be utilized in the method steps described below. Where appropriate, reference may be made to components and systems that may be used in carrying out each step. These references are for illustration, and are not intended to limit the possible ways of carrying out any particular step of the method.

FIG. 2 is a flowchart illustrating steps performed in an illustrative method, and may not recite the complete process or all steps of the method. Although various steps of method 200 are described below and depicted in FIG. 200, the steps need not necessarily all be performed, and in some cases may be performed simultaneously or in a different order than the order shown.

Step 202 of method 200 includes mixing electrode materials to form a plurality of dry electrode mixtures (AKA dry electrode mixes). Dry electrode mixtures utilized to form multilayered solventless electrodes for electrochemical cells (such as electrochemical cell 100) include a plurality of electrode materials such as active material particles, binders, conductive additives, non-active ceramic particles, and/or the like. Not all electrode mixtures include all possible electrode materials, and not all electrodes include all possible electrode materials.

Dry electrode mixtures included in multilayered solventless electrodes generally include a plurality of non-binder electrode materials adhered together by one or more binders. Mixing electrode materials to form dry electrode mixes includes mixing a unique dry electrode mix for each desired layer of a multilayered solventless electrode.

In some examples, a multilayered solventless electrode includes a first active material layer and a second active material layer. Mixing electrode materials to form dry electrode mixes therefore includes: forming a first dry electrode mix including a plurality of first active material particles and a first binder mixture and forming a second dry electrode mix including a plurality of second active material particles and a second binder mixture. In some examples, the first and second dry electrode mixes include conductive additives.

In some examples, a multilayered solventless electrode includes a first active material layer, a second active material layer, and a carbon conductive layer. Mixing electrode materials to form dry electrode mixes therefore includes: forming a first dry electrode mix including a plurality of first active material particles and a first binder mixture, forming a second dry electrode mix including a plurality of second active material particles and a second binder mixture, and forming a third dry electrode mix including a plurality of electrically conductive carbon particles and a third binder mixture. In some examples, the first and second dry electrode mixes include conductive additives.

In some examples, a multilayered solventless electrode includes a first active material layer, a second active material layer, a separator layer, and a carbon conductive layer. Mixing electrode materials to form dry electrode mixes therefore includes: forming a first dry electrode mix including a plurality of first active material particles and a first binder mixture, forming a second dry electrode mix including a plurality of second active material particles and a second binder mixture, forming a third dry electrode mix including a plurality of electrically conductive carbon particles and a third binder mixture, and forming a fourth dry electrode mix including a plurality of non-active ceramic particles and a fourth binder mixture. In some examples, the first and second dry electrode mixes include conductive additives.

In some examples, the multilayered solventless electrode is an anode, and the first and second active material particles comprise any suitable anode material or combination of anode materials, such as graphite (artificial or natural), hard carbon, titanate, titania, transition metals in general, elements in group 14 (e.g., carbon, silicon, tin, germanium, etc.), oxides, sulfides, transition metals, halides, chalcogenides, and/or the like. In some examples, the multilayered solventless electrode is a cathode, and the first and second active material particles comprise any suitable cathode material or combination of cathode materials, such as transition metals (for example, nickel, cobalt, manganese, copper, zinc, vanadium, chromium, iron), and their oxides, phosphates, phosphites, silicates, alkalines and alkaline earth metals, aluminum, aluminum oxides and aluminum phosphates, halides, chalcogenides, and/or the like. In some examples, the first active material particles and the second active material particles comprise different active materials. In some examples, the first active material particles and the second active material particles comprise active material particles having different particle shapes and/or sizes.

Conductive carbon particles utilized in carbon conductive layers may comprise any suitable carbon-based material configured to increase electrical conductivity between active material layers and the current collector, such as nanometer-sized carbon (e.g., carbon black and/or graphite); ketjen black; a graphitic carbon; a low dimensional carbon (e.g., carbon nanotubes); a carbon fiber; and/or the like.

Electrochemically inactive ceramic particles utilized in separator layers may comprise any suitable ceramic materials such as aluminum oxide (i.e., alumina ($\alpha$-Al2O3)), corundum, calcined, tabular, synthetic boehmite, silicon oxides or silica, zirconia, and/or the like. In some examples, the electrochemically inactive ceramic particles are electrically non-conductive.

Binder mixtures utilized in the dry electrode mixes may comprise any suitable material for use in dry electrode processing, such as polytetrafluorethylene (PTFE); polyolefins such as polyvinylidene difluoride (PVDF), polyethylene (PE), polypropylene (PP) polyethylene oxide (PEO), and/or their mixtures or copolymers; steryl butadiene rubber (SBR); polyacrylic acid; polyvinyl alcohol; carboxymethyl cellulose; and/or the like. In some examples, the dry electrode mixtures include binder mixtures comprising a plurality of binders. Exemplary binder mixtures include PTFE mixed with PVDF; PTFE mixed with co-polymers of PVDF, PTFE mixed with PEO; PTFE mixed with PP; and/or the like.

In some examples, such as when the binder mixtures include one or more fibrilizable polymer materials (e.g., PTFE) and one or more non-fibrilizable polymer materials (e.g., PVDF, PEO, PP), mixing electrodes to form dry electrode mixes includes two or more mixing steps. In some examples, a first mixing step includes mixing active material particles with non-fibrilizable polymer materials utilized in the binder mixture to form an intermediate mixture. In some examples, a second mixing step includes mixing the intermediate mixture with fibrilizable polymer materials utilized in the binder mixture. In some examples, the second mixing step includes heating the dry electrode mixes to initiate fibrilization, networking, and/or the formation of polymer matrices between fibrilizable binder particles.

Step 204 of method 200 includes compressing individual electrode mixtures to form electrode films. Compressing the individual electrode mixes includes applying pressure to each electrode mix formed during the previous step. In some examples, compressing the electrode mixes includes pressing the electrode mixes between a pair of rollers, thereby forming electrode films. In some examples, rollers utilized to compress the electrode mixes include raised, embossed, and/or engraved patterns disposed on external surfaces, which may increase a surface roughness of each electrode film. Increasing a surface roughness of each electrode film may result in the production of interpenetrating boundary structures (e.g., fingers, pores, etc.) at boundaries between electrode layers. Interpenetrating boundary structures may increase a structural integrity of the electrode, may increase surface adhesion between electrode layers, and may reduce interfacial resistance between electrode layers. In some examples, one roller of the pair of rollers includes patterns disposed on an external surface, and only one side of the electrode film has increased surface roughness. In some examples, both rollers of the pair of rollers include patterns disposed on an external surface, and both sides of the electrode film have increased surface roughness. In some examples, both rollers of the pair of rollers have smooth external surfaces, and both sides of the electrode film are substantially flat.

In some examples, compressing individual electrode mixtures to form electrode films also includes compressing a current collector between a pair of patterned rollers, thereby increasing a surface roughness of the current collector. In some examples, increasing the surface roughness of the current collector increases an overall surface area of the current collector.

Step 206 of method 200 includes optionally heating the electrode films. Heating the electrode films includes applying heat to the compressed electrode mixtures, thereby adhering the binder particles to each other and to the electrode components included in the electrode mixes. In some examples, rollers utilized in compressing the individual electrode mixes may be heated, and the two steps may be performed simultaneously. Fibrilizable binder materials (e.g., PTFE) form networked polymer matrices when heated, which may trap electrode material particles such as active material particles, carbon conductive particles, ceramic particles, and/or the like within interstices of a polymer matrix. Non-fibrilizable binder materials (e.g., PVDF, PEO, PE, PP) may melt when heated, thereby adhering electrode material particles to each other.

Step 208 of method 200 includes stacking the electrode films. Stacking the electrode films includes determining an order of electrode layers included in the electrode and arranging the layers. The multilayered solventless electrode may include any suitable number of layers. In some examples, the multilayered solventless electrode includes between two and four layers. In some examples, a multilayered solventless electrode includes a first active material layer and a second active material layer. Stacking the electrode films therefore includes determining which active material layer is more suitable for inclusion in a top layer of the electrode (e.g., adjacent a separator) and which active material layer is suitable for inclusion in a bottom layer of the electrode (e.g., adjacent a current collector) and arranging the layers.

In some examples, a multilayered solventless electrode includes a first active material layer, a second active material layer, and a separator layer. Stacking the electrode films therefore includes determining which active material layer is more suitable for inclusion in a top active layer of the electrode (e.g., adjacent the separator) and which active material layer is suitable for inclusion in a bottom active layer of the electrode (e.g., adjacent a current collector) and arranging the layers such that the top active material layer is adjacent the separator layer and the bottom active material layer is adjacent the current collector.

In some examples, a multilayered solventless electrode includes a first active material layer, a second active material layer, a separator layer, and a carbon conductive layer. Stacking the electrode films therefore includes determining which active material layer is more suitable for inclusion in a top active layer of the electrode (e.g., adjacent the separator) and which active material layer is suitable for inclusion in a bottom active layer of the electrode (e.g., adjacent the carbon conductive layer) and arranging the layers such that the top active material layer is adjacent the separator layer and the bottom active material layer is adjacent the carbon conductive layer, which is adjacent the current collector.

In some examples, stacking the electrode films includes increasing adhesion between electrode layers. In some examples, increasing adhesion between electrode layers includes applying a solvent spray and/or adhesive spray to one or more surfaces of each electrode layer. In some examples, one or more binders included in binder mixtures are soluble, and spraying a small amount of solvent onto electrode film surfaces may increase adhesion between electrode layers. For example, PVDF is soluble in n-methyl-2-pyrrolidone (NMP), acetone, tetrahydrofuran, methylene chloride, dimethylformamide, and/or cyclohexane. Co-polymers of PVDF may also be soluble in water, acetone, and/or other alcohols. Binders such as steryl butadiene rubber (SBR), polyacrylic acid, polyvinyl alcohol, and mixtures including carboxymethyl cellulose are soluble in water, and may be utilized in electrodes which are not sensitive to water.

In some examples, binders utilized in the binder mixtures are not soluble in any solvent (e.g., PTFE). In these examples, other binder materials solvated in small amounts of solvent may be utilized in an adhesive spray (AKA glue spray). Electrode films including PTFE may be sprayed with small amounts of PVDF solvated in NMP, which may adhere the electrode layers without requiring a long drying time or complicated solvent-collection methods.

In some examples, increasing adhesion between electrode layers includes applying a spray including a solvated conductive carbon material onto electrode film surfaces, which may both adhere layers and may fill interstices and/or air gaps between adjacent layers. Suitable conductive carbon materials may include nanometer-sized carbon (e.g., carbon black and/or graphite); ketjen black; a graphitic carbon; a low dimensional carbon (e.g., carbon nanotubes); a carbon fiber; and/or the like.

In some examples, stacking the electrode films includes laminating a bottom electrode layer to the current collector (e.g., using heating or adhesive). In some examples, stacking the electrode films includes heating the current collector using an external heater or a plurality of heated rollers, thereby increasing adhesion with a bottom electrode layer.

Step 210 of method 200 includes compressing the stacked electrode films. Compressing the stacked films includes applying pressure to stacked layers simultaneously. In some examples, compressing the stacked films includes utilizing a single pair of rollers to compress the electrode stack. In some examples, compressing the stacked films causes interpenetrating boundary structures to form between adjacent layers having increased surface roughness. Compressing the stacked films may cause the density of layers disposed adjacent to the current collector to be higher than that of layers disposed further away from the current collector.

Step 212 of method 200 includes heating the compressed electrode stack. Heating the compressed electrode stack includes applying heat to the compressed electrode films, thereby adhering the binder particles to each other and to the electrode components included in the electrode mixes. In some examples, rollers utilized in compressing the electrode stack may be heated, and the two steps may be performed simultaneously. Fibrilizable binder materials (e.g., PTFE) form networked polymer matrices when heated, which may trap electrode material particles such as active material particles, carbon conductive particles, ceramic particles, and/or the like within interstices of a polymer matrix. Non-fibrilizable binder materials (e.g., PVDF, PEO, PE, PP) may melt when heated, thereby adhering adjacent electrode layers to each other. In some examples, the current collector may be heated to preferentially increase the compressibility of the active material layer closest to the current collector.

C. Illustrative Manufacturing System

Figure 3:
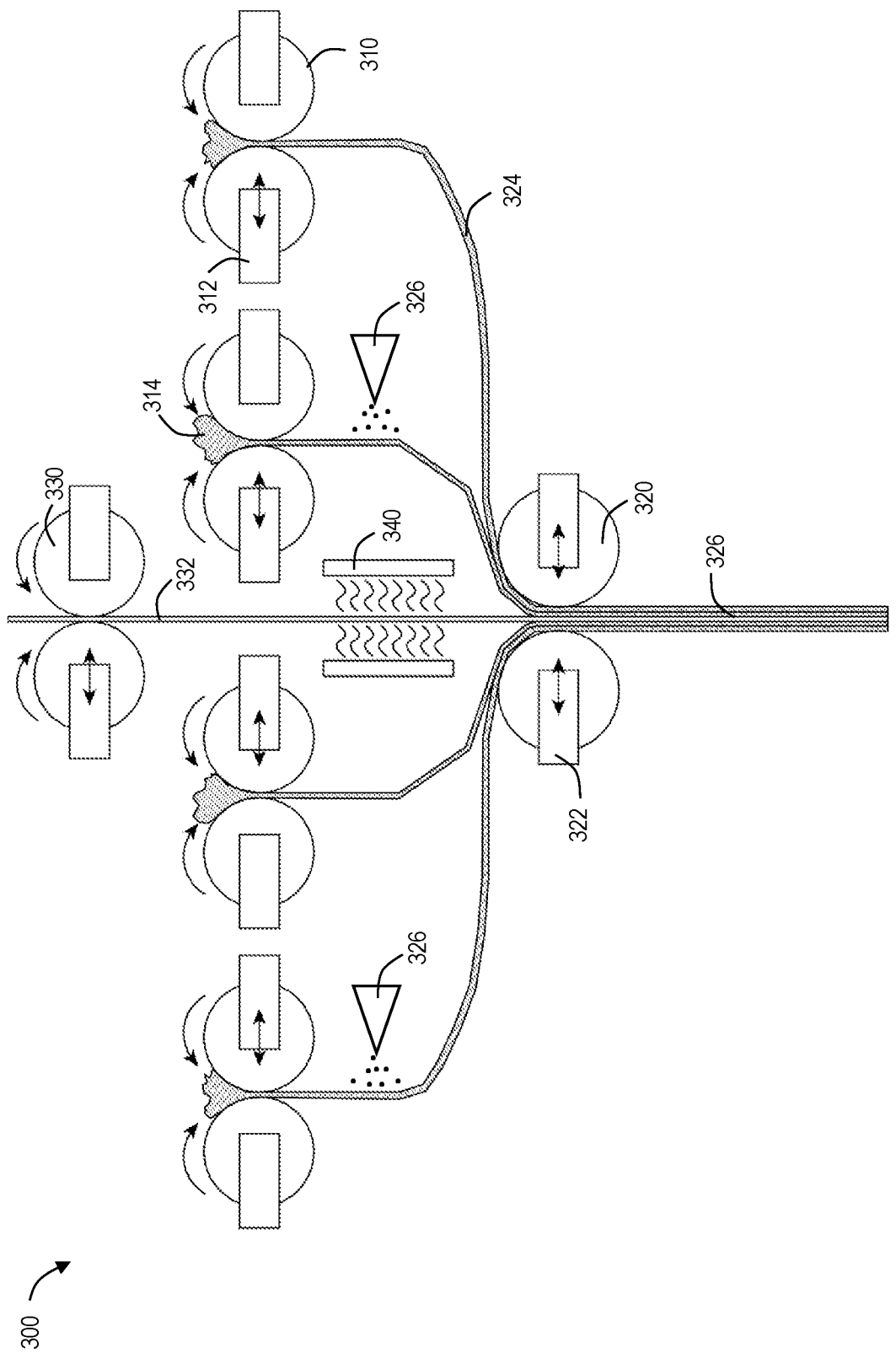
FIG. 3 is a schematic view of an illustrative manufacturing system for solventless multilayered electrodes in accordance with aspects of the present disclosure.

Turning now to FIG. 3, an illustrative manufacturing system 300 for use with method 200 will now be described. In some examples, a system including a plurality of rollers configured to compress dry electrode mixes into electrode films and to compress stacks of electrode films into electrodes may be used to manufacture multilayered solventless electrodes.

Manufacturing system 300 includes a first plurality of pairs of rollers 310 configured to compress dry electrode mixes 314 comprising particulate into electrode films. Each roller 310 is mounted onto an axle coupled to a pair of movable arms 312, which are configured to laterally move the rollers 310. Laterally moving each pair of rollers 310, either inward and outward may vary a density and a thickness of an electrode film produced by each pair of rollers. In some examples, only a single roller of each pair of rollers may be moveable. In use, each pair of rollers 310 may be disposed a different distance apart, each producing an electrode film 324 having a different thickness. Rollers 310 may be actuated by a motor, which rotates the rollers inward toward a dry electrode mix disposed between the rollers. In some examples, a hopper is utilized to pour pre-mixed dry electrode mixes into a space between each pair of rollers. In some examples, rollers 310 are heated, and may initiate the formation of polymer matrices, lattices, and/or networks between binder particles included in electrode mixes. System 300 may include any suitable number of pairs of rollers configured to produce any suitable number of electrode layers.

A second pair of rollers 320 is configured to compress a stack of electrode films 324 produced using rollers 310 into a single electrode stack 326 including two multilayered electrodes with a current collector disposed between the electrodes. Each roller of the pair of rollers 320 is mounted onto an axle coupled to a pair of movable arms 322, which are configured to laterally move the rollers 320. Laterally moving each pair of rollers 320, either inward and outward may vary a density of the completed electrodes. Compressing stack 326 with the second pair of rollers may cause electrode layers disposed closer to the current collector to have a higher density than rollers disposed further away from the current collector. Rollers 320 may be actuated by a motor, which rotates the rollers inward toward the electrode stack disposed between the rollers. In some examples, rollers 310 are heated, and may initiate the formation of polymer matrices, lattices, and/or networks between binder particles of adjacent electrode films.

Figure 4:
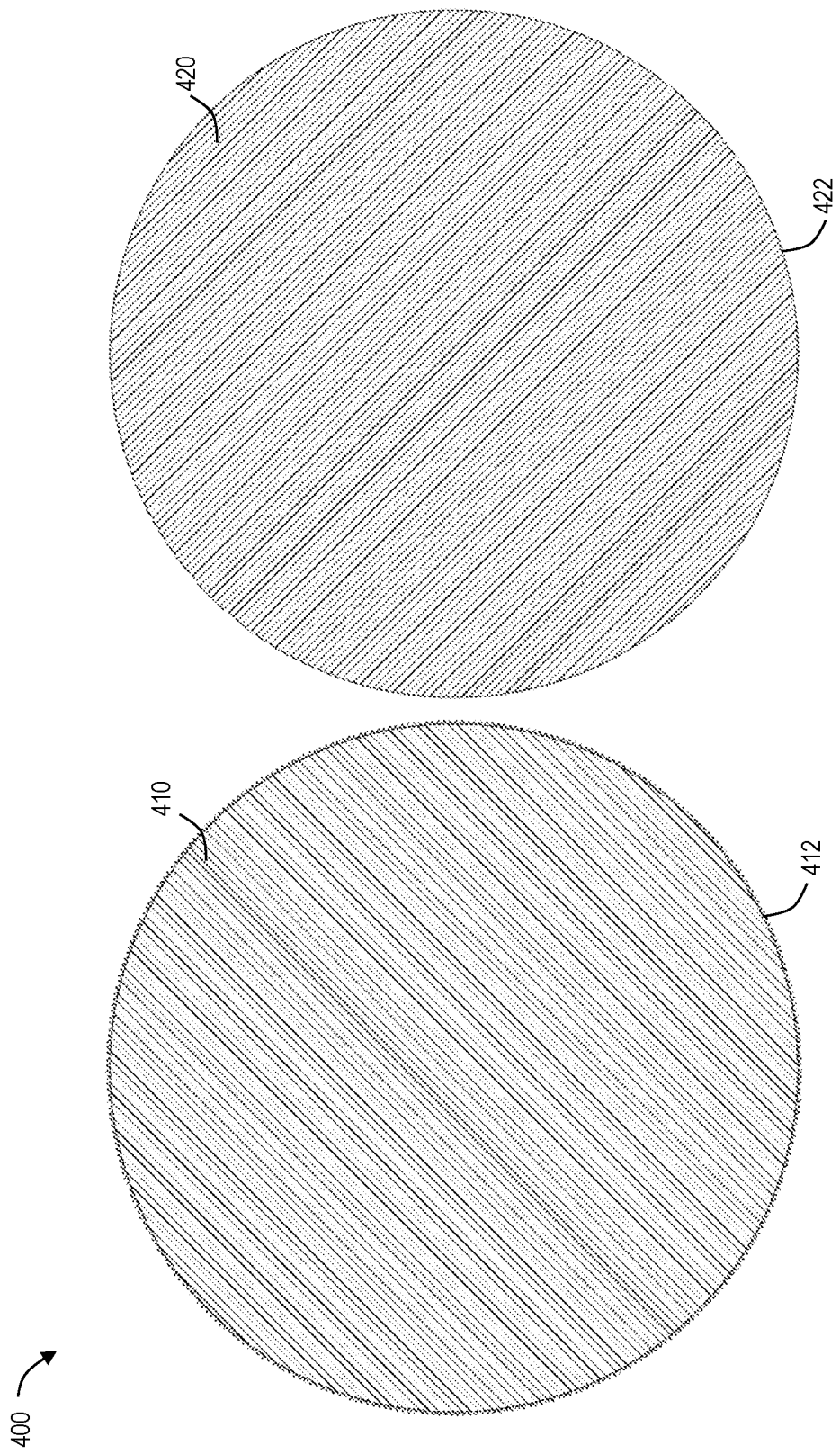
FIG. 4 is a schematic view of a first set of rollers for use with the manufacturing system of FIG. 3.
Figure 5:
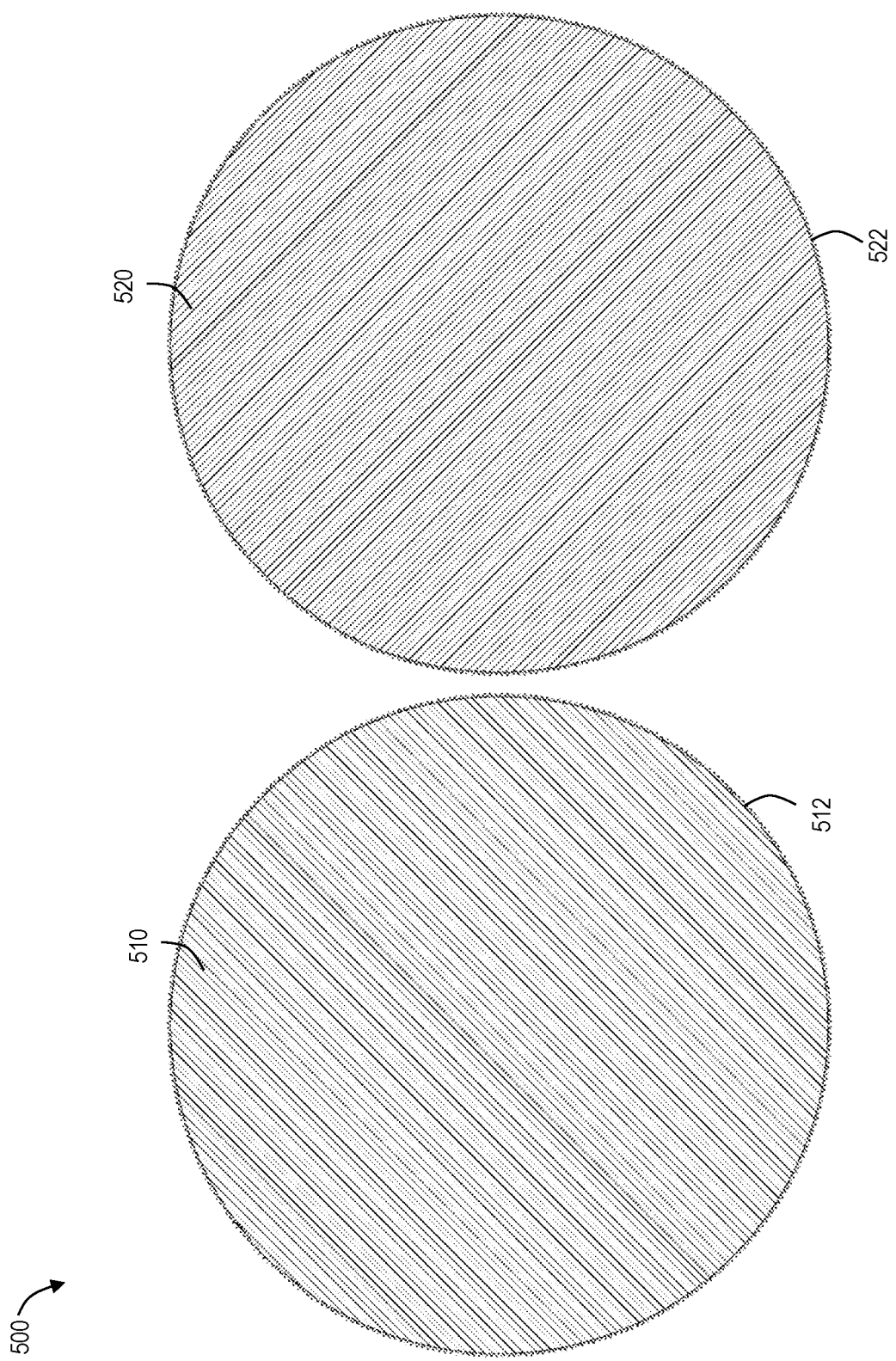
FIG. 5 is a schematic view of a second set of rollers for use with the manufacturing system of FIG. 3.

Rollers 310 and 320 may include patterns and/or structures configured to increase a surface roughness of the electrode films and electrodes, such as tooths, grooves, castellations, pins, and/or the like. FIGS. 4 and 5 are schematic diagrams of pairs of rollers 400 and 500 suitable for use with manufacturing system 300. In some examples, one roller 410 of a pair of rollers 400 includes pattern 412, and a second roller 420 of the pair of rollers has a smooth external surface 422 (see FIG. 4). Pair of rollers 400 may be suitable for use on outermost layers of the electrode, producing surface adhesion between an outermost layer and an adjacent layer, while providing a smooth external electrode surface. In some examples, both a first and a second roller 510, 520 of a pair of rollers 500 include first and second patterns 512, 522 (see FIG. 5). Patterns and/or structures roughening adjacent layers need not match or interlock, as roughened surfaces of electrode layers mesh, interlock, and/or form interpenetrating structures when compressed by rollers 320.

In some examples, system 300 includes a third pair of rollers 330, which are configured to roughen a current collector 332. Rollers 330 may be substantially identical to rollers 500, described above. Roughening current collector 322 may increase a total surface area and surface roughness of the current collector, which may increase adhesion between an adjacent electrode film and the current collector, and may increase electrical conductivity.

Current collector 322 may be transported through manufacturing system 300 in a roll-to-roll process, which may pass the current collector through rollers 330 and rollers 320. In some examples, current collector 322 is heated by an optional heater 340 which may heat the current collector, further increasing electrode film adhesion. In some example, rollers 330 are heated and heater 340 is unnecessary.

In some examples, system 300 includes a plurality of sprayers 326, configured to spray a solvent or adhesive spray onto external surfaces of electrode films. In some examples, sprayers 326 are configured to spray a solvated carbon conductive material onto external surfaces of the electrode films, which may fill interstices between layers when the electrode stack is compressed. In some examples, the plurality of sprayers are configured to spray a solvated binder material onto external surfaces, which may adhere adjacent layers.

D. First Illustrative Multilayered Solventless Electrode

Figure 6:
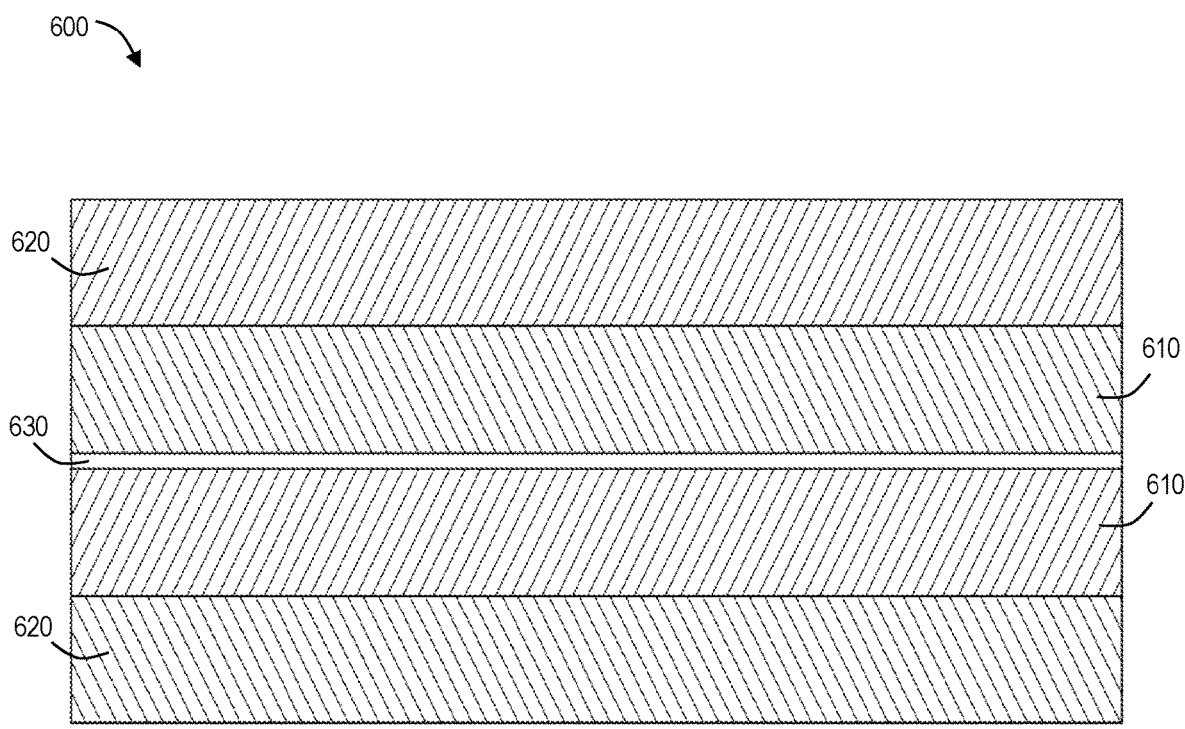
FIG. 6 is a schematic view of illustrative solventless multilayered electrodes in accordance with aspects of the present disclosure.

As shown in FIG. 6, this section describes a first illustrative multilayered solventless electrode 600 including a first active layer 610 and a second active layer 620. First active layer 610 is disposed on and directly contacting a current collector 630, and includes a plurality of first active material particles mixed with a plurality of first binder particles. Second active layer 620 is disposed on and directly contacting first layer 620, and includes a plurality of second active material particles mixed with a plurality of second binder particles. An electrolyte may be disposed throughout the electrode. First active layer 610 and second active layer 620 are examples of electrode films manufactured as described in method 200.

In some examples, electrode 600 is an anode, and the first and second active material particles comprise any suitable anode material or combination of anode materials, such as graphite (artificial or natural), hard carbon, titanate, titania, transition metals in general, elements in group 14 (e.g., carbon, silicon, tin, germanium, etc.), oxides, sulfides, transition metals, halides, chalcogenides, and/or the like. In some examples, electrode 600 is a cathode, and the first and second active material particles comprise any suitable cathode material or combination of cathode materials, such as transition metals (for example, nickel, cobalt, manganese, copper, zinc, vanadium, chromium, iron), and their oxides, phosphates, phosphites, silicates, alkalines and alkaline earth metals, aluminum, aluminum oxides and aluminum phosphates, halides, chalcogenides, and/or the like. In some examples, the first active material particles and the second active material particles comprise different active materials. In some examples, the first active material particles and the second active material particles comprise active material particles having different particle shapes and/or sizes.

The first and second binder mixture may comprise any suitable material for use in dry electrode processing, such as polytetrafluorethylene (PTFE); polyolefins such as polyvinylidene difluoride (PVDF), polyethylene (PE), polypropylene (PP) polyethylene oxide (PEO), and/or their mixtures or copolymers; steryl butadiene rubber (SBR); polyacrylic acid; polyvinyl alcohol; carboxymethyl cellulose; and/or the like. In some examples, the dry electrode mixtures include binder mixtures comprising a plurality of binders. Exemplary binder mixtures include PTFE mixed with PVDF; PTFE mixed with co-polymers of PVDF, PTFE mixed with PEO; PTFE mixed with PP; and/or the like.

Binder mixtures may include any suitable ratio of binder materials. For example, binder mixtures may include PTFE mixed with PVDF in a ratio from 1:3 to 3:1. In some examples, binder mixtures include PTFE mixed with any suitable non-fibrilizing binder material in a ratio from 1:3 to 3:1. In some examples, binder mixtures include between 20% and 98% PTFE by weight.

In some examples, one or both of first active layer 610 and second active layer 620 include conductive additives, such as nanometer-sized carbon (e.g., carbon black and/or graphite); ketjen black; a graphitic carbon; a low dimensional carbon (e.g., carbon nanotubes); a carbon fiber; and/or the like. First active layer 610 and second active layer 620 may include any suitable mixtures of active material components. In some examples, first active layer 610 includes 70% to 99% active material particles by weight, 1% to 20% binder particles by weight, and 1% to 10% carbon conductive material by weight. In some examples, second active layer 620 includes 70% to 99% active material particles by weight, 1% to 20% binder particles by weight, and 1% to 10% carbon conductive material by weight.

In examples wherein a binder mixture includes PTFE, active material particles and carbon conductive particles included in the respective electrode layer are disposed within interstices formed within a fibrillized polymer matrix formed by the PTFE. In examples wherein a binder mixture includes a polyolefin material, such as PVDF, PEO, PE, PP, and/or the like, the polyolefin may melt and encapsulate active material particles and carbon conductive particles in a matrix formed by the melted polyolefin material.

E. Second Illustrative Multilayered Solventless Electrode

Figure 7:
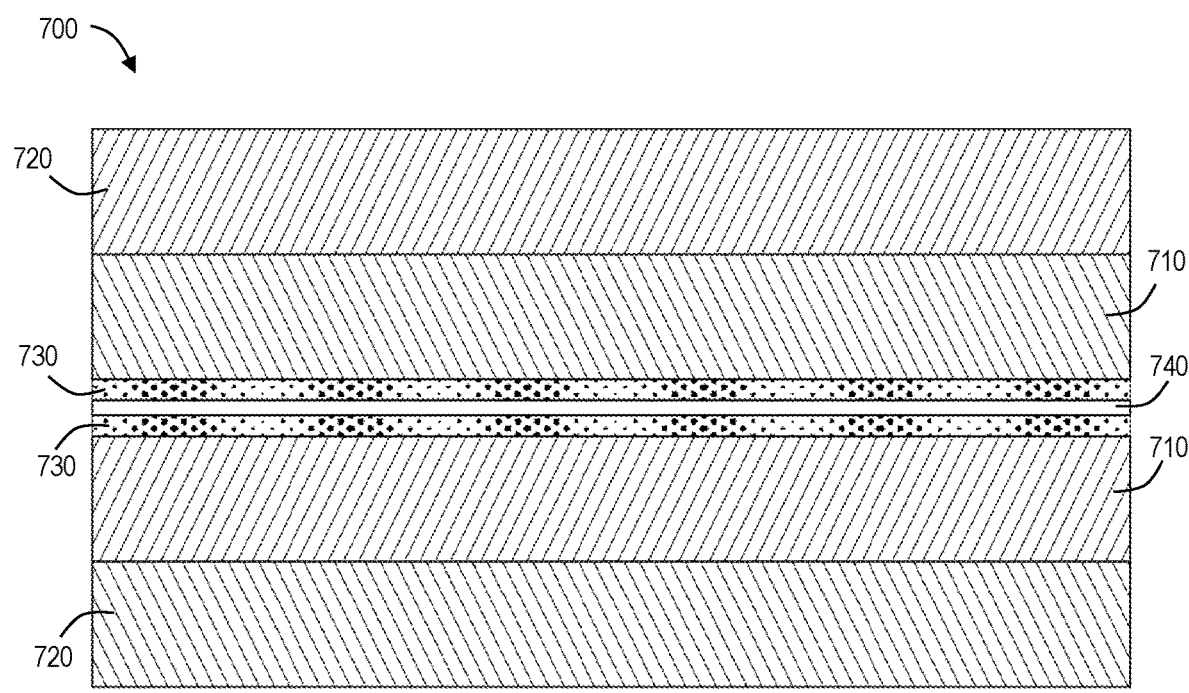
FIG. 7 is a schematic view of illustrative solventless multilayered electrodes including conductive carbon layers.

As shown in FIG. 7, this section describes a second illustrative multilayered solventless electrode 700 including a carbon conductive layer 730, a first active layer 710, and a second active layer 720. Carbon conductive layer 730 is disposed on and directly contacting a current collector 740, and includes a plurality of carbon conductive particles mixed with a plurality of third binder particles. First active layer 710 is disposed on and directly contacting carbon conductive layer 730 and includes a plurality of first active material particles mixed with a plurality of first binder particles. Second active layer 720 is disposed on and directly contacting first active layer 710, and includes a plurality of second active material particles mixed with a plurality of second binder particles. An electrolyte may be disposed throughout the electrode. First active layer 710, second active layer 720, and carbon conductive layer 730 are examples of electrode films manufactured as described in method 200. Electrode 700 may be substantially identical to electrode 600, except as described below.

Carbon conductive layer 730 may improve electrical conductivity between first active layer 710 and current collector 740. In some examples, carbon conductive layer 730 insulates the current collector from heat generated by the active layers.

The carbon conductive particles may comprise any suitable carbon-based material configured to increase electrical conductivity between active material layers and the current collector, such as nanometer-sized carbon (e.g., carbon black and/or graphite); ketjen black; a graphitic carbon; a low dimensional carbon (e.g., carbon nanotubes); a carbon fiber; and/or the like.

The third binder mixture may comprise any suitable material for use in dry electrode processing, such as polytetrafluorethylene (PTFE); polyolefins such as polyvinylidene difluoride (PVDF), polyethylene (PE), polypropylene (PP) polyethylene oxide (PEO), and/or their mixtures or copolymers; steryl butadiene rubber (SBR); polyacrylic acid; polyvinyl alcohol; carboxymethyl cellulose; and/or the like. In some examples, the dry electrode mixtures include binder mixtures comprising a plurality of binders. Exemplary binder mixtures include PTFE mixed with PVDF; PTFE mixed with co-polymers of PVDF, PTFE mixed with PEO; PTFE mixed with PP; and/or the like.

Binder mixtures may include any suitable ratio of binder materials. For example, binder mixtures may include PTFE mixed with PVDF in a ratio from 1:3 to 3:1. In some examples, binder mixtures include PTFE mixed with any suitable non-fibrilizing binder material in a ratio from 1:3 to 3:1. In some examples, binder mixtures include between 20% and 98% PTFE by weight.

Carbon conductive layer 730 may include any suitable mixtures of carbon conductive particles and binder particles. In some examples, carbon conductive layer 730 includes 50% to 95% carbon conductive particles by weight, and 1% to 50% binder particles by weight.

In examples wherein a binder mixture includes PTFE, carbon conductive particles included in the respective electrode layer are disposed within interstices formed within a fibrillized polymer matrix formed by the PTFE. In examples wherein a binder mixture includes a polyolefin material, such as PVDF, PEO, PE, PP, and/or the like, the polyolefin may melt and encapsulate carbon conductive particles in a matrix formed by the melted polyolefin material.

F. Third Illustrative Multilayered Solventless Electrode

Figure 8:
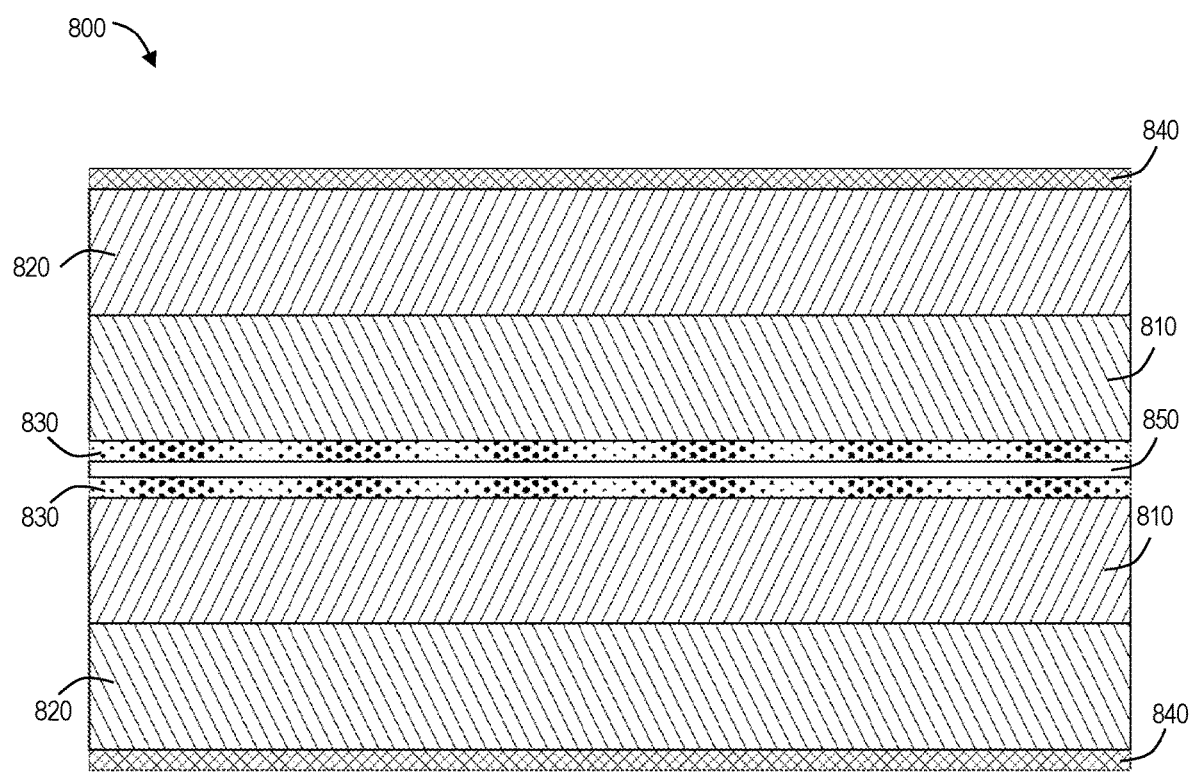
FIG. 8 is a schematic view of an illustrative solventless multilayered electrodes including conductive carbon layers and integrated ceramic separator layers.

As shown in FIG. 8, this section describes a third illustrative multilayered solventless electrode 800 including a carbon conductive layer 830, a first active layer 810, a second active layer 820, and an integrated separator layer 840. Carbon conductive layer 830 is disposed on and directly contacting a current collector 850, and includes a plurality of carbon conductive particles mixed with a plurality of third binder particles. First active layer 810 is disposed on and directly contacting carbon conductive layer 830, and includes a plurality of first active material particles mixed with a plurality of first binder particles. Second active layer 820 is disposed on and directly contacting first active layer 810, and includes a plurality of second active material particles mixed with a plurality of second binder particles. Integrated separator layer 840 is disposed on and directly contacting second active layer 820, and includes a plurality of electrochemically inactive ceramic particles mixed with a plurality of fourth binder particles. An electrolyte may be disposed throughout the electrode. First active layer 810, second active layer 820, carbon conductive layer 830, and integrated separator layer 840 are examples of electrode films manufactured as described in method 200. Electrode 800 may be substantially identical to electrode 700, except as described below.

Separator layer 840 may be configured such that the separator isolates the electrode (e.g., anode or cathode) from an adjacent electrode included within an electrochemical cell, while maintaining permeability to a charge carrier such as a lithium-ion containing electrolyte. In some embodiments, the electrochemically inactive particles comprise ceramics such as aluminum oxide (i.e., alumina ($\alpha$-$Al_2O_3$)), corundum, calcined, tabular, synthetic boehmite, silicon oxides or silica, zirconia, and/or the like. In some examples, the electrochemically inactive particles are electrically non-conductive.

The fourth binder mixture may comprise any suitable material for use in dry electrode processing, such as polytetrafluorethylene (PTFE); polyolefins such as polyvinylidene difluoride (PVDF), polyethylene (PE), polypropylene (PP) polyethylene oxide (PEO), and/or their mixtures or copolymers; steryl butadiene rubber (SBR); polyacrylic acid; polyvinyl alcohol; carboxymethyl cellulose; and/or the like. In some examples, the dry electrode mixtures include binder mixtures comprising a plurality of binders. Exemplary binder mixtures include PTFE mixed with PVDF; PTFE mixed with co-polymers of PVDF, PTFE mixed with PEO; PTFE mixed with PP; and/or the like.

Binder mixtures may include any suitable ratio of binder materials. For example, binder mixtures may include PTFE mixed with PVDF in a ratio from 1:3 to 3:1. In some examples, binder mixtures include PTFE mixed with any suitable non-fibrilizing binder material in a ratio from 1:3 to 3:1. In some examples, binder mixtures include between 20% and 98% PTFE by weight.

Integrated separator layer 840 may include any suitable mixtures of electrochemically inactive ceramic particles and binder particles. In some examples, integrated separator layer 840 includes 50% and 99% electrochemically inactive ceramic particles by weight, and 1% to 50% binder particles by weight. In some examples, integrated separator layer 840 includes greater than 99% electrochemically inactive ceramic particles by weight, and less than 1% binder particles by weight. In some examples, integrated separator layer 840 includes less than 50% electrochemically inactive ceramic particles by weight, and greater than 50% binder particles by weight.

In examples wherein a binder mixture includes PTFE, electrochemically inactive ceramic particles included in the respective electrode layer are disposed within interstices formed within a fibrillized polymer matrix formed by the PTFE. In examples wherein a binder mixture includes a polyolefin material, such as PVDF, PEO, PE, PP, and/or the like, the polyolefin may melt and encapsulate electrochemically inactive ceramic particles in a matrix formed by the melted polyolefin material.

G. First Illustrative Multilayered Solventless Electrode Stack

Figure 9:
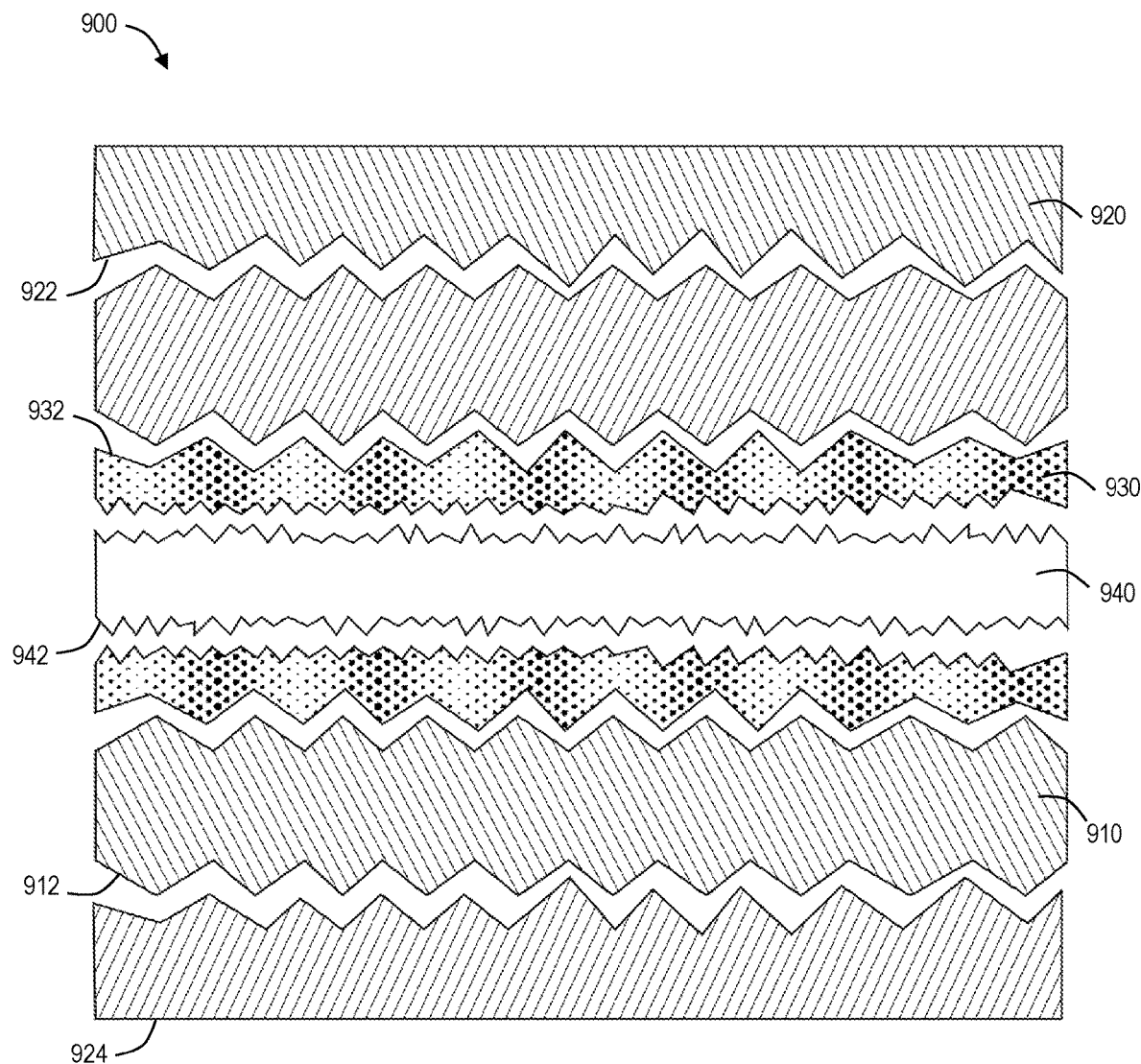
FIG. 9 is a schematic view of illustrative solventless electrodes including conductive carbon layers and roughened layer interfaces in accordance with aspects of the present disclosure.

As shown in FIG. 9, this section describes a first illustrative multilayered solventless electrode stack 900 including a carbon conductive layer 930, a first active layer 910, and a second active layer 920. Carbon conductive layer 930 is disposed on and directly contacting a current collector 940, and includes a plurality of carbon conductive particles mixed with a plurality of third binder particles. First active layer 910 is disposed on and directly contacting carbon conductive layer 930 and includes a plurality of first active material particles mixed with a plurality of first binder particles. Second active layer 920 is disposed on and directly contacting first active layer 910, and includes a plurality of second active material particles mixed with a plurality of second binder particles. An electrolyte may be disposed throughout the electrode. First active layer 910, second active layer 920, and carbon conductive layer 930 are examples of electrode films manufactured as described in method 200. Electrode 900 may be substantially identical to electrode 700, except as described below.

FIG. 9 depicts a stack of roughened electrode films, as described in method 200. The roughened electrode films depicted in FIG. 9 form interpenetrating electrode structures when calendered as an electrode stack, as described with respect to step 208 of method 200. Each electrode film surface includes a plurality of protrusions, castellations, fingers, and/or the like, which result from manufacturing an electrode film utilizing patterned rollers. First active layer 910 and carbon conductive layer 930 are manufactured using rollers 500, as described above. First active layer 910 and carbon conductive layer 930 include roughened surfaces 912, 932 disposed on both sides of the electrode layer. In contrast, second active layer 920 is manufactured using rollers 400, as described above. Second active layer 920 includes one roughened internal surface 922 and one smooth external surface 924. As electrode 900 does not include an integrated ceramic separator, external surface 924 is configured to interface with a polyolefin (e.g., polyethylene, polypropylene, etc.) separator disposed on the external surface. Current collector 940 also includes roughened surfaces 942, which increase adhesion with conductive layer 930 when calendered.

In some examples, roughened surfaces 912, 932, 922 have a tailored surface roughness. In some examples, roughened surfaces 912, 932, 922 have a maximum-minimum differential (e.g., between peaks and valleys) from 0.5 µm to 10 µm.

In response to calendering, the roughened surfaces depicted in FIG. 9 will create interpenetrating boundary structures configured to decrease interfacial resistance between the layers, reduce lithium plating, and increase adhesion between the layers. An interlocking region will be disposed between respective roughened, layers, comprising a non-planar boundary between layers. In some examples, each layer may include respective, three-dimensional, interpenetrating structures, interchangeably referred to as protrusions, castellations, extensions, projections, fingers, and/or the like locking adjacent layers together, forming a mechanically robust interface that is capable of withstanding stresses, such as those due to electrode expansion and compression. Additionally, the non-planar surfaces defined by the fingers represent an increased total surface area of the interface boundary, which may provide increased interfacial resistance and may increase ion mobility through the electrode. The relationship between the fingers may be described as interlocking, interpenetrating, intermeshing, interdigitating, interconnecting, interlinking, and/or the like.

When particles of the electrode formed from electrode stack 900 are lithiating or delithiating, the electrode remains coherent, and the bottom layer and the top layer remain bound by the interlocking region. In general, the interdigitation or interpenetration of fingers, as well as the increased surface area of the interphase boundary, function to adhere the two zones together.

During charging and discharging of the battery, active material particles may contract and expand, causing the layers to contract and swell. During swelling and contracting, the electrode may remain coherent, and electrode layers may remain bound by the interlocking region. This bonding of the layers may decrease interfacial resistance between the layers and maintain mechanical integrity of an electrochemical cell including the electrode.

H. Second Illustrative Multilayered Solventless Electrode Stack

Figure 10:
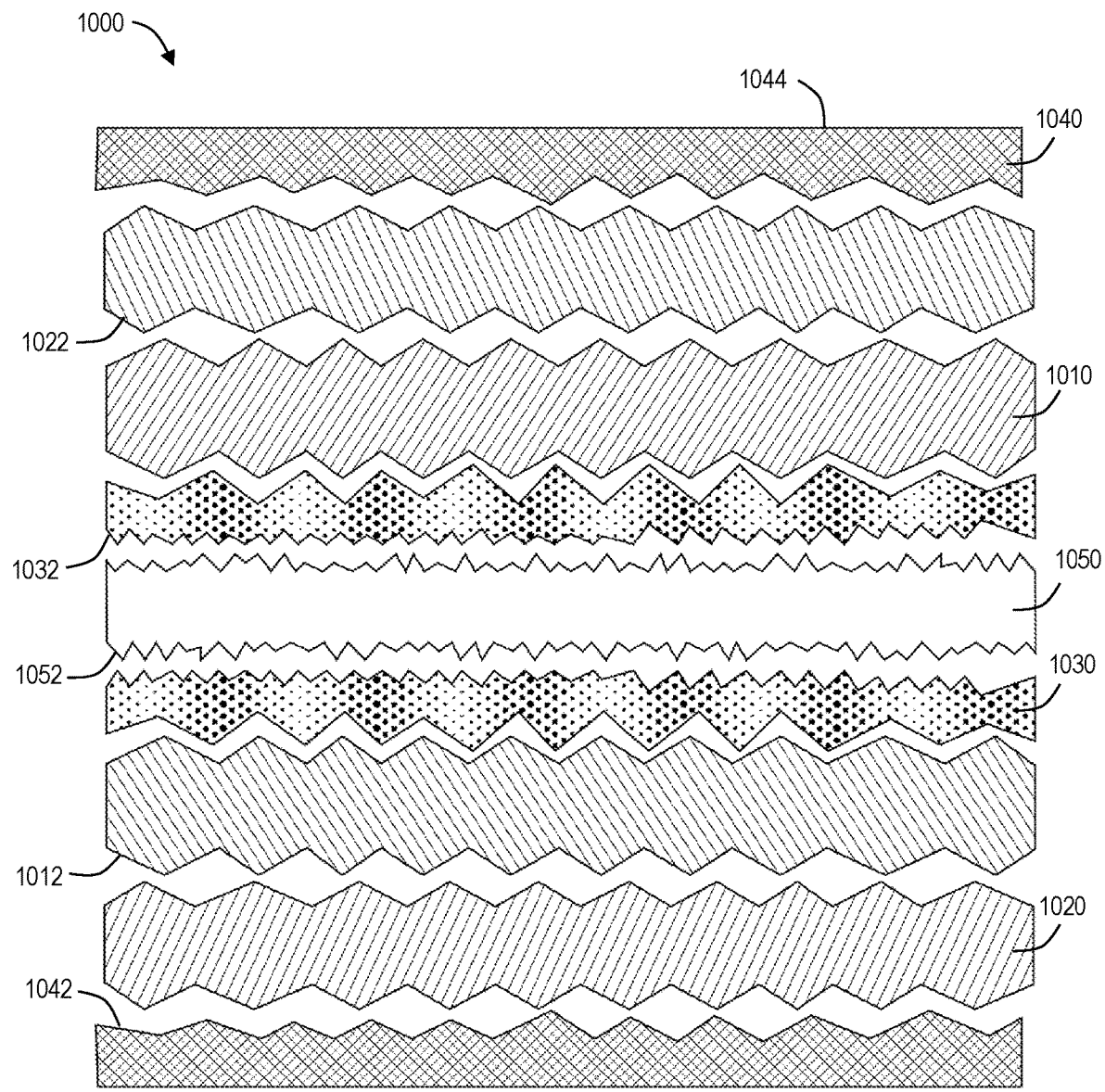
FIG. 10 is a schematic view of illustrative solventless multilayered electrodes including conductive carbon layers, integrated ceramic separator layers, and roughened layer interfaces in accordance with aspects of the present disclosure.

As shown in FIG. 10, this section describes a second illustrative multilayered solventless electrode stack 1000 including a carbon conductive layer 1030, a first active layer 1010, a second active layer 1020, and an integrated separator layer 1040. Carbon conductive layer 1030 is disposed on and directly contacting a current collector 1050, and includes a plurality of carbon conductive particles mixed with a plurality of third binder particles. First active layer 1010 is disposed on and directly contacting carbon conductive layer 1030, and includes a plurality of first active material particles mixed with a plurality of first binder particles. Second active layer 1020 is disposed on and directly contacting first active layer 1010, and includes a plurality of second active material particles mixed with a plurality of second binder particles. Integrated separator layer 1040 is disposed on and directly contacting second active layer 1020, and includes a plurality of electrochemically inactive ceramic particles mixed with a plurality of fourth binder particles. An electrolyte may be disposed throughout the electrode. First active layer 1010, second active layer 1020, carbon conductive layer 1030, and integrated separator layer 1040 are examples of electrode films manufactured as described in method 200. Electrode 1000 may be substantially identical to electrode 800, except as described below.

FIG. 10 depicts a stack of roughened electrode films, as described in method 200. The roughened electrode films depicted in FIG. 10 form interpenetrating electrode structures when calendered as an electrode stack, as described with respect to step 208 of method 200. Each electrode film surface includes a plurality of protrusions, castellations, fingers, and/or the like, which result from manufacturing an electrode film utilizing patterned rollers. First active layer 1010, second active layer 1020, and carbon conductive layer 1030 are manufactured using rollers 500, as described above. First active layer 1010, second active layer 1020, and carbon conductive layer 1030 include roughened surfaces 1012, 1022, and 1032 disposed on both sides of the electrode layer. In contrast, integrated ceramic separator layer 1040 is manufactured using rollers 400, as described above. Integrated ceramic separator layer 1040 includes one roughened internal surface 1042 and one smooth external surface 1044. External surface 1044 is configured to interface with a polyolefin (e.g., polyethylene, polypropylene) separator disposed on the external surface, or with an adjacent integrated ceramic separator of another electrode. Current collector 1050 also includes roughened surfaces 1052, which increase adhesion with conductive layer 1052 when calendered.

In some examples, roughened surfaces 1012, 1022, 1032, 1042 have a tailored surface roughness. In some examples, roughened surfaces 1012, 1022, 1032, 1042 have a maximum-minimum differential (e.g., between peaks and valleys) from 0.5 μm to 10 μm.

In response to calendering, the roughened surfaces depicted in FIG. 10 will create interpenetrating boundary structures configured to decrease interfacial resistance between the layers, reduce lithium plating, and increase adhesion between the layers. An interlocking region will be disposed between respective roughened, layers, comprising a non-planar boundary between layers. In some examples, each layer may include respective, three-dimensional, interpenetrating structures, interchangeably referred to as protrusions, castellations, extensions, projections, fingers, and/or the like locking adjacent layers together, forming a mechanically robust interface that is capable of withstanding stresses, such as those due to electrode expansion and compression. Additionally, the non-planar surfaces defined by the fingers represent an increased total surface area of the interface boundary, which may provide increased interfacial resistance and may increase ion mobility through the electrode. The relationship between the fingers may be described as interlocking, interpenetrating, intermeshing, interdigitating, interconnecting, interlinking, and/or the like.

When particles of the electrode formed from electrode stack 1000 are lithiating or delithiating, the electrode remains coherent, and the bottom layer and the top layer remain bound by the interlocking region. In general, the interdigitation or interpenetration of fingers, as well as the increased surface area of the interphase boundary, function to adhere the two zones together.

During charging and discharging of the battery, active material particles may contract and expand, causing the layers to contract and swell. During swelling and contracting, the electrode may remain coherent, and electrode layers may remain bound by the interlocking region. This bonding of the layers may decrease interfacial resistance between the layers and maintain mechanical integrity of an electrochemical cell including the electrode.

I. Illustrative Combinations and Additional Examples

This section describes additional aspects and features of solventless multilayered electrodes, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A method for manufacturing a solventless electrode, the method comprising:
mixing a plurality of electrode particles to form a plurality of dry electrode mixtures;
compressing each electrode mixture of the plurality of dry electrode mixtures to form a plurality of electrode films;
stacking the electrode films; and
compressing the stacked electrode films.

A1. The method of paragraph A0, further comprising heating the electrode films.

A2. The method of paragraph A0 or A1, further comprising heating the stacked electrode films.

A3. The method of any of paragraphs A0 through A2, wherein the dry electrode mixtures include a first dry electrode mixture comprising a plurality of first active material particles and a first binder mixture, and a second dry electrode mixture comprising a plurality of second active material particles and a second binder mixture.

A4. The method of paragraph A3, wherein the dry electrode mixtures further include a third dry electrode mixture comprising a plurality of electrically conductive carbon particles and a third binder mixture.

A5. The method of paragraph A3 or A4, wherein the dry electrode mixtures further include a fourth dry electrode mixture comprising a plurality of non-active ceramic particles and a fourth binder mixture.

A6. The method of any of paragraphs A3 through A5, wherein the solventless electrode is an anode.

A7. The method of any of paragraphs A3 through A5, wherein the solventless electrode is a cathode.

A8. The method of any of paragraphs A3 through A7, wherein each of the binder mixtures comprises a mixture of polytetrafluoroethylene and a polyolefin.

A9. The method of paragraph A8, wherein the polyolefin comprises polyvinylidene difluoride.

A10. The method of any of paragraphs A0 through A9, wherein compressing each electrode mixture includes pressing the electrode mixture between a pair of rollers.

A11. The method of paragraph A10, wherein at least one roller of the pair of rollers includes a pattern disposed on an external surface, wherein the at least one roller is configured to increase a surface roughness of an electrode film compressed between the pair of rollers.

A12. The method of any of paragraphs A0 through A11, wherein stacking the electrode films includes determining an order of electrode layers included in the electrode and arranging the layers.

A13. The method of any of paragraphs A0 through A12, further including increasing adhesion between the electrode films.

A14. The method of paragraph A13, wherein increasing adhesion between the electrode films further includes applying a solvent spray to one or more surfaces of each electrode film.

A15. The method of paragraph A13, wherein increasing adhesion between the electrode films further includes applying an adhesive spray comprising binder molecules solvated in small amounts of solvent to one or more surfaces of each electrode film.

A16. The method of paragraph A13, wherein increasing adhesion between the electrode films further includes applying a spray including a solvated conductive carbon material to one or more surfaces of each electrode film.

A17. The method of any of paragraphs A0 through A16, wherein compressing the stacked electrode films includes pressing the stacked electrode films between a pair of rollers.

B0. A system for manufacturing solventless electrodes, the system comprising:
a first plurality of rollers configured to compress dry electrode mixtures comprising particulate into electrode films; and
a second pair of rollers configured to compress a stack of electrode films into a single electrode stack.

B1. The system of paragraph B0, wherein at least one roller of the first plurality of rollers includes patterns disposed on an exterior surface configured to increase a surface roughness of the electrode films.

B2. The system of paragraph B0 or B1, further including a third pair of rollers having patterns disposed on an exterior surface, the patterns configured to increase a surface roughness of a current collector.

B3. The system of any of paragraphs B0 through B2, further comprising a heater.

B4. The system of any of paragraphs B0 through B3, further comprising a plurality of sprayers configured to spray a solvent or adhesive onto surfaces of the electrode films.

C0. An electrode for an electrochemical cell comprising:
a current collector substrate;
a first active material layer layered onto the current collector substrate, the first active material layer comprising a first electrode film including a first plurality of active material particles adhered together by a first binder mixture; and
a second active material layer layered onto the first active material layer, the second active material layer comprising a second electrode film including a second plurality of active material particles adhered together by a second binder mixture;
wherein the first electrode film and the second electrode film include active material particles encapsulated in a polymer matrix formed by the binder mixture.

C1. The electrode of paragraph C0, further comprising a carbon conductive layer disposed between the current collector substrate and the first active material layer, the carbon conductive layer comprising a third electrode film including a plurality of conductive carbon particles adhered together by a third binder mixture.

C2. The electrode of paragraph C0 or C1, further comprising an integrated separator layer layered onto the second active material layer, the integrated separator layer comprising a plurality of non-active ceramic particles adhered together by a fourth binder mixture.

C3. The electrode of any of paragraphs C0 through C2, wherein each of the binder mixtures comprises a mixture of polytetrafluoroethylene and a polyolefin.

C4. The method of paragraph C3, wherein the polyolefin comprises polyvinylidene difluoride.

D0. A method for manufacturing a solventless electrode, the method comprising:
mixing a first plurality of active material particles with a first binder to form a first dry electrode mixture;
mixing a second plurality of active material particles with a second binder to form a second dry electrode mixture;
compressing the first dry electrode mixture to form a first electrode film;
compressing the second dry electrode mixture to form a second electrode film;
stacking the first electrode film onto a current collector and the second electrode film onto the first electrode film; and
compressing the stacked electrode films.

D1. The method of paragraph D0, further comprising heating the first electrode film and the second electrode film, thereby adhering the binders and the active material particles together.

D2. The method of paragraph D0 or D1, further comprising heating the stacked electrode films, thereby adhering the electrode films to each other.

D3. The method of any of paragraphs D0 through D2, further comprising:
mixing a first plurality of electrically conductive carbon particles with a third binder to form a third dry electrode mixture;
compressing the third dry electrode mixture to form a third electrode film; and
stacking the third electrode film between the current collector and the first electrode film.

D4. The method of any of paragraphs D0 through D3, further comprising:
mixing a first plurality of electrochemically inactive ceramic particles with a fourth binder to form a fourth dry electrode mixture;
compressing the fourth dry electrode mixture to form a fourth electrode film; and
stacking the fourth electrode film onto the second electrode film.

D5. The method of any of paragraphs D0 through D4, wherein the first binder and the second binder each comprise a mixture of polytetrafluoroethylene and a polyolefin.

D6. The method of paragraph D5, wherein the polyolefin comprises polyvinylidene difluoride.

D7. The method of any of paragraphs D0 through D6, wherein compressing the first dry electrode mixture and the second dry electrode mixture includes pressing each electrode mixture between a pair of rollers.

D8. The method of paragraph D7, wherein at least one roller of the pair of rollers includes a pattern disposed on an external surface, wherein the at least one roller is configured to increase a surface roughness of an electrode film compressed between the pair of rollers.

D9. The method of any of paragraphs D0 through D8, further including increasing adhesion between the electrode films.

D10. The method of paragraph D9, wherein increasing adhesion between the electrode films further includes applying a solvent spray to one or more surfaces of each electrode film.

D11. The method of paragraph D9, wherein increasing adhesion between the electrode films further includes applying an adhesive spray comprising binder molecules solvated in small amounts of solvent to one or more surfaces of each electrode film.

D12. The method of paragraph D9, wherein increasing adhesion between the electrode films further includes applying a spray including a solvated conductive carbon material to one or more surfaces of each electrode film.

D13. The method of any of paragraphs D0 through D12, wherein compressing the stacked electrode films includes pressing the stacked electrode films between a pair of rollers.

Advantages, Features, and Benefits

The different embodiments and examples of the multilayered solventless electrodes described herein provide several advantages over known solutions for manufacturing electrodes for Li-ion electrochemical cells. For example, illustrative embodiments and examples described herein reduce the use of expensive and environmentally toxic solvents.

Additionally, and among other benefits, illustrative embodiments and examples described herein allow for the use of multiple active materials in different layers of a solventless electrode, thereby improving electrochemical properties of the electrode.

Additionally, and among other benefits, illustrative embodiments and examples described herein improve surface adhesion between electrode layers manufactured using dry manufacturing techniques.

Additionally, and among other benefits, illustrative embodiments and examples described herein reduce manufacturing time of electrodes and electrochemical cells by eliminating any drying steps.

Additionally, and among other benefits, illustrative embodiments and examples described herein allow increased control over layer features, including thickness, density, and surface roughness.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A solventless method for manufacturing an electrode, the method comprising:
   compressing a first dry electrode mixture between a first pair of rollers to form a first standalone electrode film, wherein a first roller of the first pair of rollers includes a pattern disposed on an external surface;
   increasing a surface roughness of a first surface of the first standalone electrode film using the first roller of the first pair of rollers;
   compressing a second dry electrode mixture between a second pair of rollers to form a second standalone electrode film, wherein a second roller of the second pair of rollers includes a pattern disposed on an external surface;
   increasing a surface roughness of a second surface of the second standalone electrode film using the second roller of the second pair of rollers;
   stacking the first standalone electrode film onto a current collector;
   stacking the second standalone electrode film onto the first standalone electrode film, such that the first surface of the first standalone electrode film is adjacent to the second surface of the second standalone electrode film; and
   compressing the stacked electrode films such that interpenetrating boundary structures form between the first standalone electrode film and the second standalone electrode film.

2. The method of claim 1, wherein the first dry electrode mixture comprises a first plurality of active material particles and a first binder mixture.

3. The method of claim 2, wherein the second dry electrode mixture comprises a second plurality of active material particles and a second binder mixture.

4. The method of claim 2, wherein the second dry electrode mixture comprises a plurality of electrochemically inactive ceramic particles and a second binder.

5. The method of claim 2, wherein the first binder mixture comprises a fibrilizable polymer material mixed with a non-fibrilizable polymer material.

6. The method of claim 5, wherein the fibrilizable polymer material comprises polytetrafluorethylene, and wherein the non-fibrilizable polymer material comprises a polyolefin.

7. The method of claim 2, further comprising heating the first standalone electrode film and the second standalone electrode film, thereby adhering the binders and the active material particles together.

8. The method of claim 7, further comprising heating the stacked electrode films, thereby adhering the electrode films to each other.

9. The method of claim 2, further comprising:
   mixing a first plurality of electrically conductive carbon particles with a third binder to form a third dry electrode mixture;
   compressing the third dry electrode mixture between a third pair of rollers to form a third standalone electrode film; and
   stacking the third standalone electrode film between the current collector and the first standalone electrode film.

10. The method of claim 2, further comprising:
   mixing a first plurality of electrochemically inactive ceramic particles with a fourth binder to form a fourth dry electrode mixture;
   compressing the fourth dry electrode mixture between a fourth pair of rollers to form a fourth standalone electrode film; and
   stacking the fourth standalone electrode film onto the second standalone electrode film.

11. The method of claim 2, further comprising compressing the current collector between a pair of patterned rollers, such that the patterned rollers increase a surface roughness of the current collector.

* * * * *